(12) United States Patent
Nekomoto et al.

(10) Patent No.: US 6,223,464 B1
(45) Date of Patent: May 1, 2001

(54) APPARATUS FOR REPELLING GROUND TERMITES

(76) Inventors: Nelson M Nekomoto, 47-653 Uakea Pl., Kaneohe, HI (US) 96744; Jerry S Chang, 3345 Sierra Dr., Honolulu, HI (US) 96816

( * ) Notice: Subject to any disclaimer, the term of this patent is extended or adjusted under 35 U.S.C. 154(b) by 0 days.

(21) Appl. No.: 09/436,180

(22) Filed: Nov. 8, 1999

(51) Int. Cl.$^7$ ................................................ A01M 1/22
(52) U.S. Cl. .......................................... 43/112; 43/132.1
(58) Field of Search ............................... 43/98, 112, 124, 43/132.1; 47/1.3

(56) References Cited

U.S. PATENT DOCUMENTS

| | | | |
|---|---|---|---|
| 565,384 | * | 8/1896 | Fuchs .................................. 47/1.3 |
| 784,346 | * | 3/1905 | Pilsoudsky et al. .................... 47/1.3 |
| 1,172,367 | * | 2/1916 | Kitsee .................................. 47/1.3 |
| 2,468,972 | * | 5/1949 | Hagerty ................................ 47/1.3 |
| 2,484,443 | * | 10/1949 | Baker .................................. 47/1.3 |
| 2,607,164 | * | 8/1952 | Fenton ................................ 47/1.3 |
| 2,647,228 | | 7/1953 | Just .................................... 361/232 |
| 2,831,804 | * | 4/1958 | Collopy ................................ 47/1.3 |
| 3,258,872 | | 7/1966 | Senkewich .......................... 43/132.1 |
| 3,504,892 | | 4/1970 | Crist .................................... 256/10 |
| 3,826,035 | * | 7/1974 | Paniagua .............................. 43/98 |
| 3,835,578 | | 9/1974 | Basile .................................. 43/132.1 |
| 3,858,346 | | 1/1975 | Bailey .................................. 43/124 |
| 4,043,073 | | 8/1977 | Basile .................................. 43/124 |
| 4,223,468 | | 9/1980 | Lawrence ............................ 43/132.1 |
| 4,241,532 | | 12/1980 | Fancy .................................. 43/112 |
| 4,366,644 | | 1/1983 | Lawrence ............................ 43/132.1 |
| 4,504,468 | | 3/1985 | Brill et al. ............................ 424/617 |
| 4,625,474 | | 12/1986 | Peacock et al. ...................... 52/101 |
| 4,635,393 | | 1/1987 | Pfeffer, Sr. et al. .................. 43/112 |
| 4,667,436 | | 5/1987 | Benson ................................ 43/132.1 |
| 4,758,318 | * | 7/1988 | Yoshida .............................. 47/1.3 |
| 4,782,623 | | 11/1988 | Lawrence ............................ 43/132.1 |
| 4,817,331 | * | 4/1989 | Podsiadly et al. .................... 47/1.3 |
| 4,823,520 | | 4/1989 | Ebeling ................................ 52/101 |
| 4,833,158 | | 5/1989 | Twydell et al. ...................... 514/616 |
| 4,839,984 | | 6/1989 | Saunders et al. .................... 43/112 |

(List continued on next page.)

FOREIGN PATENT DOCUMENTS

| | | |
|---|---|---|
| 1265566 | 2/1968 | (CH) . |
| 2739165 | 12/1978 | (DE) . |
| 2731905 | 2/1979 | (DE) . |
| 3935340 | 4/1990 | (DE) . |
| 3835670 | * 4/1990 | (DE) . |
| 2300101 | * 10/1996 | (GB) . |
| 6-237678 | * 8/1994 | (JP) . |
| WO 88/03754 | 6/1988 | (WO) . |

*Primary Examiner*—Darren W. Ark
(74) *Attorney, Agent, or Firm*—Michael I. Kroll (57) ABSTRACT

An apparatus for repelling ground termites from an area surrounding a structure. The apparatus is connected to a power source and includes first second sets of electrodes positioned in a ground area on opposing sides of the structure. A first lead line is connected between the first set of electrodes and the power source for supplying an electrical current to the first set of electrodes and a second lead line is connected between the second set of electrodes and the power source for supplying an electrical current to the second set of electrodes. The electrical current supplied to the first and second sets of electrodes is delivered to the ground in which the first and second sets of electrodes is positioned and flows through the ground between the first and second sets of electrodes forming a barrier region within which any termites will be electrocuted. The first and second sets of electrodes preferably include at least four electrodes. Each of the plurality of electrodes in the first and second sets of electrodes are in the form of one of spikes and flat metal plates. The first and second sets of electrodes each extend for a distance longer than the side of the structure on which they are positioned and are positioned at a depth in the ground below a foundation of the structure. The first and second sets of electrodes are also preferably positioned at a distance from each other greater than the width of the structure.

3 Claims, 5 Drawing Sheets

U.S. PATENT DOCUMENTS

| | | | |
|---|---|---|---|
| 4,858,375 | 8/1989 | Mountain | 43/124 |
| 4,917,299 | 4/1990 | Kondo et al. | 239/8 |
| 4,953,320 | 9/1990 | Nelson | 43/121 |
| 5,007,197 | 4/1991 | Barbett | 43/124 |
| 5,026,734 | 6/1991 | Browing | 514/723 |
| 5,097,641 | 3/1992 | Hand et al. | 52/101 |
| 5,107,620 | 4/1992 | Mahan | 43/112 |
| 5,151,443 | 9/1992 | Henrick | 514/486 |
| 5,184,418 | 2/1993 | Fletcher | 43/124 |
| 5,435,096 | 7/1995 | Nekomoto | 43/112 |
| 5,464,456 * | 11/1995 | Kertz | 47/1.3 |
| 5,592,774 * | 1/1997 | Galyon | 43/124 |

* cited by examiner

FIG 1

FIG 2
FRONT VIEW

APPARATUS FOR REPELLING GROUND TERMITES

BACKGROUND OF THE INVENTION

1. Field of the Invention

The present invention relates generally to termite repellents and, more specifically, to an apparatus for repelling ground termites from a desired area through application of a voltage to the ground surrounding the desired area thereby creating an electrical barrier.

2. Description of the Prior Art

Numerous types of termite repellent devices have been provided in the prior art. For example, U.S. Pat. Nos. 4,635,393; 4,667,436; 4,839,984 and 5,435,096 all are illustrative of such prior art. While these units may be suitable for the particular purpose to which they address, they would not be as suitable for the purposes of the present invention as heretofore described.

U.S. Pat. No. 4,635,393

Inventor: Harry L. Pfeffer, Sr. et al.

Issued: Jan. 13, 1987

The disclosure relates to a device for killing ants and other insects by electrocution. The device includes an elongated shaft or probe for insertion into the anthill and an adapter for connecting the device to an electrical source. A charge ring is spaced from a charge plate between which ants can pass. When ants attack the device having been inserted into the anthill, those that find themselves between the charge plate and the charge ring will short circuit the device causing the ants to be electrocuted.

U.S. Pat. No. 4,667,436

Inventor: James A. Benson

Issued: May 26, 1987

An apparatus powered by an electric alternating current source comprising an insulator having the upper end of a spike mounted therein and two wires wrapped about the insulator forming a double helical coil. The two wires have a voltage of about 1000–1500 volts placed across them to electrocute fire ants upon contact. The spike is inserted into the ground thus supporting the apparatus in an upright position.

U.S. Pat. No. 4,839,984

Inventor: Anne L. Saunders et al.

Issued: Jun. 20, 1989

A non-toxic, non-chemical device and system for repelling crawling insects from a structure such as a building and training the insects to go elsewhere includes closely-spaced elongated conductors mounted on an insulating base and having a potential difference applied thereto for providing an insect-stunning short-circuit current of about fifteen microamps. When insects bridge the conductors, they receive a current as a function of their internal resistance. The conductors are mounted via the base along the foundation and about posts and other structures which connect into the building. Preferably, the conductors are also slippery and reflective to assist in repelling and training the insects without bridging the conductors.

U.S. Pat. No. 5,435,096

Inventor: Nelson M. Nekomoto

Issued: Jul. 25, 1995

An apparatus and method utilizing a phase-locked high voltage, high-frequency generator or alternator capable of quasi-unlimited power output for feeding electric power into pest-infected earth via an electric conducting wire, for example termite infested ground Utilizing a conventional line power, the power source produces high energy pulses. The pulses are fed into an under-ground electrical conducting wire for application at high voltages. The voltages penetrate the earth and electrocute and repel the nematrodes and arthropods contained therein.

SUMMARY OF THE PRESENT INVENTION

The present invention relates generally to termite repellents and, more specifically, to an apparatus for repelling ground termites from a desired area through application of a voltage to the ground surrounding the desired area thereby creating an electrical barrier.

A primary object of the present invention is to provide an apparatus for repelling ground termites that will overcome the shortcomings of prior art devices.

Another object of the present invention is to provide an apparatus for repelling ground termites which is able to provide protection for a desired area from termites by treating the ground of the area with an electrical current.

A further object of the present invention is to provide an apparatus for repelling ground termites which is able to provide protection for generally inaccessible areas such as beneath a wooden structure.

A yet further object of the present invention is to provide an apparatus for repelling ground termites wherein the electrical current is supplied by a plurality of electrodes extending into the ground.

A still further object of the present invention is to provide an apparatus for repelling ground termites wherein the plurality of electrodes are in the form of metal stakes which can be easily inserted into the ground.

An even further object of the present invention is to provide an apparatus for repelling ground termites wherein the electrodes are in the form of flat metal plates of any desired shape or size.

A yet further object of the present invention is to provide an apparatus for repelling ground termites including two sets of electrodes positioned in the ground on opposing ends of the desired protection area whereby the electrical current flows through the soil and between the two sets of electrodes.

A still further object of the present invention is to provide an apparatus for repelling ground termites wherein each set of electrodes includes at least four electrodes.

An even further object of the present invention is to provide an apparatus for repelling ground termites that is simple and easy to use.

A still further object of the present invention is to provide an apparatus for repelling ground termites that is economical in cost to manufacture.

Additional objects of the present invention will appear as the description proceeds.

An apparatus for repelling ground termites from an area surrounding a structure is disclosed by the present invention. The apparatus is connected to a power source and includes first second sets of electrodes positioned in a ground area on opposing sides of the structure. A first lead line is connected between the first set of electrodes and the power source for supplying an electrical current to the first set of electrodes and a second lead line is connected between the second set of electrodes and the power source for supplying an electrical current to the second set of electrodes. The electrical current supplied to the first and second sets of electrodes is delivered to the ground in which the first and second sets of electrodes is positioned and flows through the ground between the first and second sets of electrodes forming a barrier region within which any termites will be electrocuted. The first and second sets of electrodes preferably include at least four electrodes. Each of the plurality of electrodes in the first and second sets of electrodes are in the form of one of spikes and flat metal plates. The first and second sets of electrodes each extend for a distance longer than the side of the structure on which they are positioned and are positioned at a depth in the ground below a foundation of the structure. The first and second sets of electrodes are also preferably positioned at a distance from each other greater than the width of the structure.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the apparatus for repelling ground termites of the present invention. With regard to the reference numerals used, the following numbering is used throughout the various drawing figures.

10 apparatus for repelling ground termites of the present invention
12 ground area in which apparatus is positioned
14 structure being protected by apparatus
16 protection area
18 termites
20 first set of electrodes
22 second set of electrodes
24 power source
26 lines indicating flow of electrical current
30 electrodes of first set
32 common point connecting electrodes of first set
34 lead line connecting common point to power source
36 electrodes of second set
38 common point connecting electrodes of second set
40 lead line connecting common point to power source
42 arrows indicating flow of current between first and second sets of electrodes

DETAILED DESCRIPTION OF THE PREFERRED EMBODIMENT

Turning now descriptively to the drawings, in which similar reference characters denote similar elements throughout the several views, FIGS. 1 through 4 illustrate the apparatus for repelling ground termites of the present invention indicated generally by the numeral 10.

Figure 1:
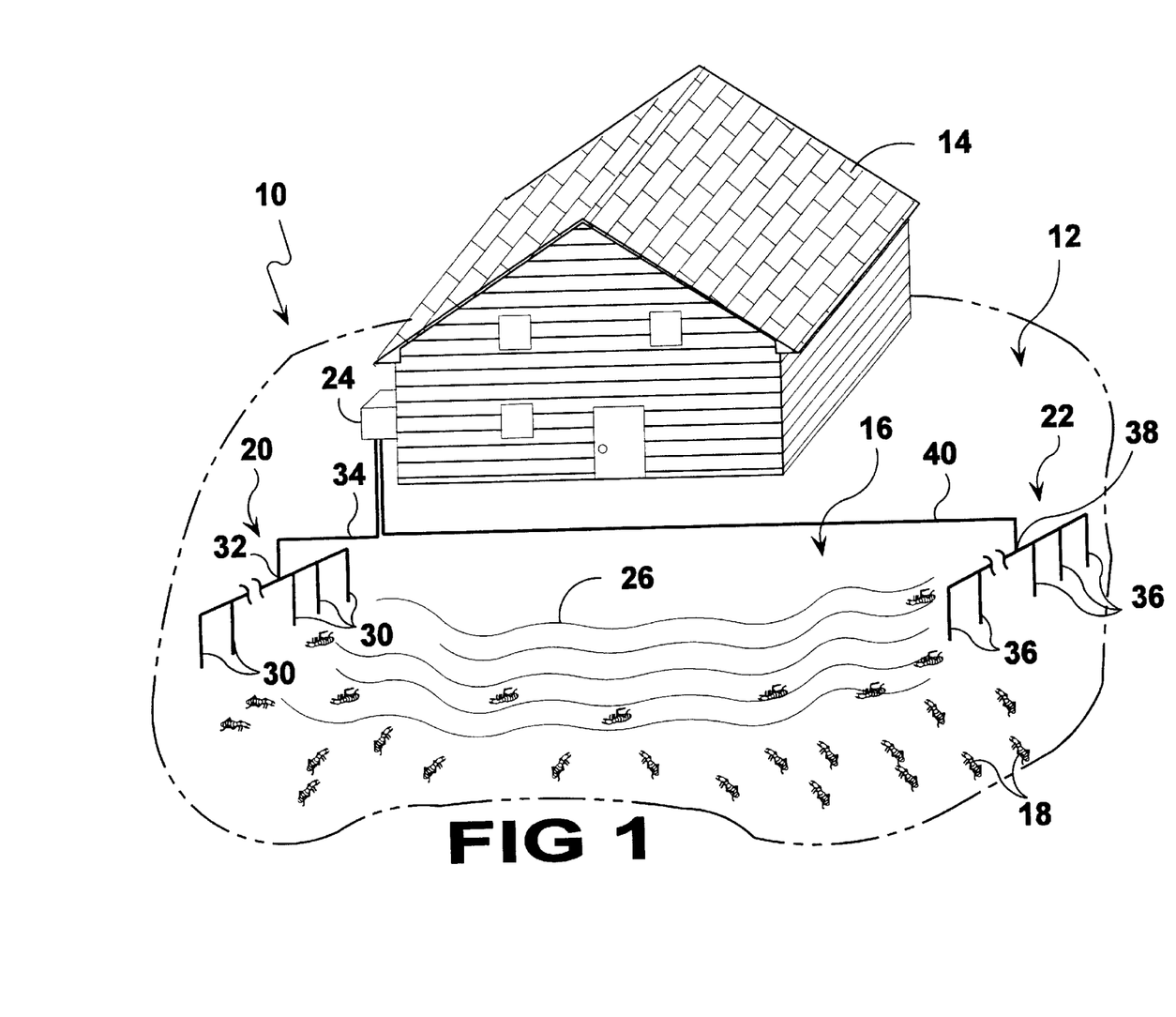
FIG. 1 is a top perspective view of the apparatus for repelling ground termites of the present invention positioned to provide an electrical current to an area surrounding a structure.

The apparatus for repelling ground termites 10 is illustrated in FIG. 1 positioned in the ground 12 surrounding a structure 14 at a distance below the foundation of the structure 14. The apparatus for repelling ground termites 10 is positioned to protect a desired area 16 surrounding the structure 14 from termites 18 and other pest infestations such as nematodes and arthropods which may do damage to the structure 14. The apparatus includes first and second sets of electrodes 20 and 22, respectively. The first and second sets of electrodes 20 and 22 are both connected to a power source 24. The power source 24 is preferably the power source to the structure 14.

The first set of electrodes 20 is positioned below the ground 12 surface at one end of the desired area 16 defining a first side of the desired area 16. The second set of electrodes 22 is positioned below the ground 12 surface on an opposite end of the desired area 16 defining a second side of the desired area 16. The remainder of the boundary defining the desired area 16 is determined by the span of the first and second sets of electrodes. Preferably, the first and second sets of electrodes 20 and 22 are positioned on opposite sides of the structure 14 located within the desired area 16. When power is supplied to the first and second sets of electrodes 20 and 22 by the power source 24 a current is caused to flow through the first and second sets of electrodes 20 and 22 and therebetween due to the conductive nature of the soil. The flow of electrical current between the first and second sets of electrodes 20 and 22 is indicated by the wavy lines labeled with the numeral 26. The flowing current 26 creates an electrical barrier to termites, nematodes and arthropods crawling in the soil between the first and second sets of electrodes 20 and 22. Termites 18 and other insects and pests located underground and between the first and second sets of electrodes 20 and 22 are repelled by this electrical barrier and electrocuted. Any termites 18 and other insects and pests attempting to enter the desired area 16 defined by the flow of electrical current are also electrocuted upon entering the desired area 16. Thus, the termites 18 and other insects and pests are prevented from doing damage to the structure 14 or crawling through cracks within the surface of the structure 14 as they are unable to approach the structure 14.

Figure 1A:
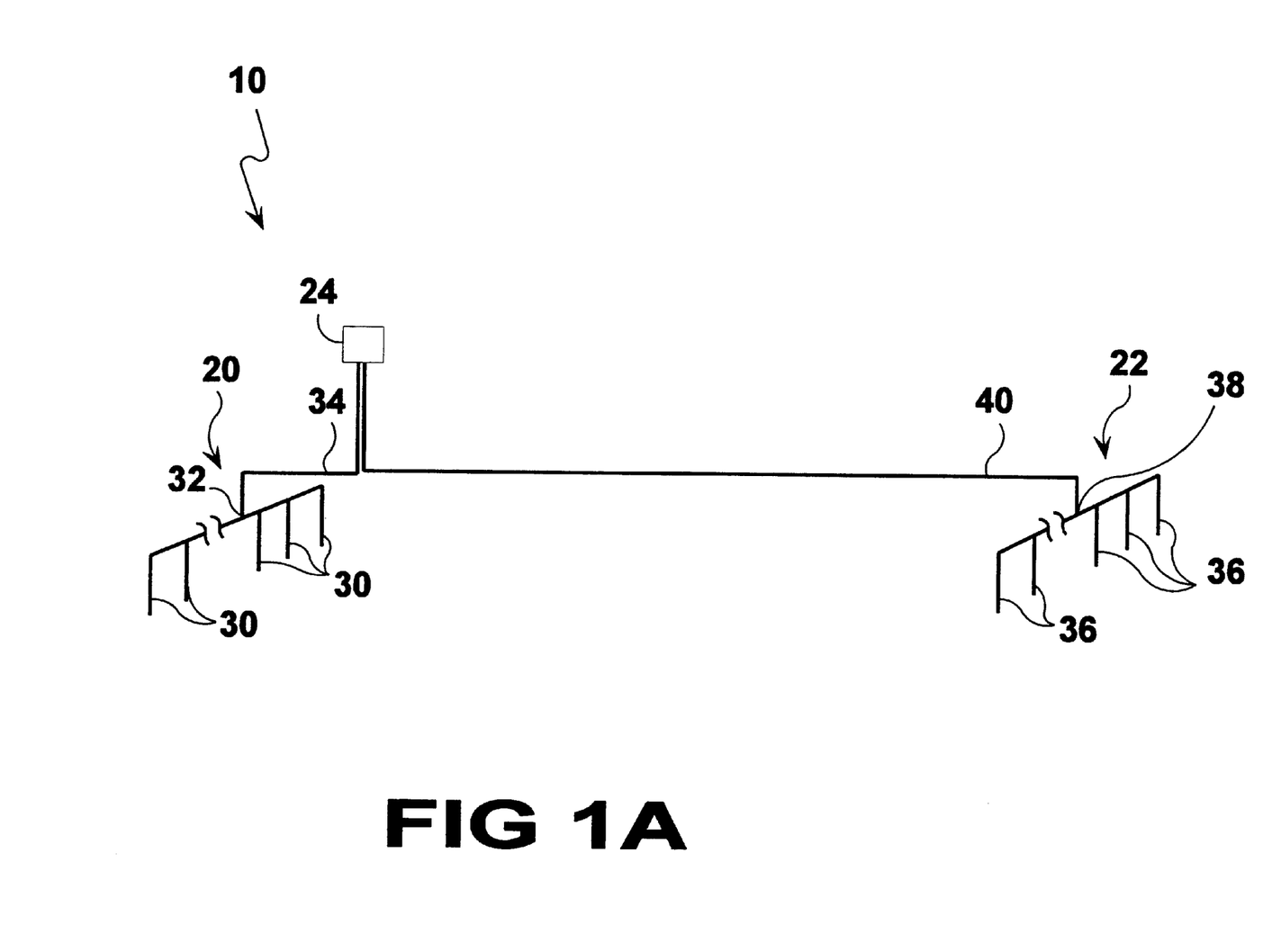
FIG. 1A is a perspective view of the apparatus for repelling ground termites of the present invention shown in FIG. 1.

As can be seen from FIG. 1A, the first set of electrodes 20 includes a number of individual electrodes 30. Each electrode 30 is connected at a common point 32. A lead line 34 connects the electrodes 30 to the power source 24. The second set of electrodes 22 also includes a number of individual electrodes 36. Each electrode 36 is connected at a common point 38. A lead line 40 is connected to the common point 38 for connecting the electrodes 36 to the power source 24. The first and second sets of electrodes 20 and 24 preferably include at least four (4) electrodes in the set. The first and second sets of electrodes 20 and 22 also preferably contain an equal number of electrodes. The electrodes 30 and 36 forming the first and second set of electrodes 20 and 22 are formed from any one of metal stakes, flat metal plates, or any other conductive material as long as the electrical current supplied by the power source 24 flows therethrough and is able to flow through the soil and between the first and second sets of electrodes 20 and 22.

Figure 2:
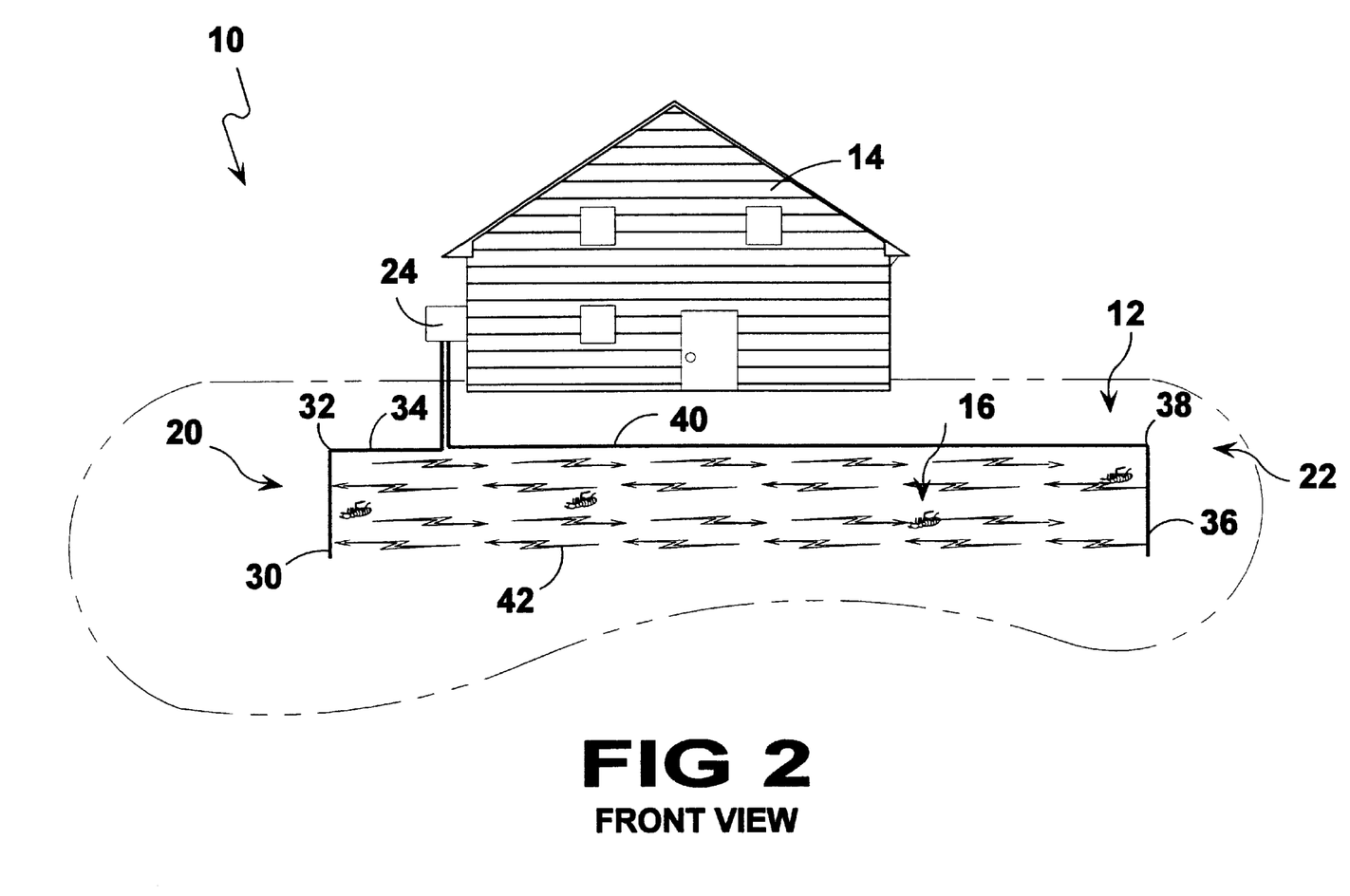
FIG. 2 is a front view of the apparatus for repelling ground termites of the present invention.

A side view of the apparatus for repelling ground termites 10 positioned below a structure 14 is illustrated in FIG. 2. This figure illustrates the position of the first and second sets of electrodes 20 and 22 beneath the structure 14. The first and second sets of electrodes 20 and 22 are positioned at a distance greater than the length of the structure 14. Each of the first and second sets of electrodes 20 and 22 are positioned outside the area covered by the structure 14 so as to create a protected area greater than the area covered by the structure 14. Thus, an area surrounding the structure 14 is also protected from infestations from termites 18 and the structure 14 is further protected as termites 18 are unable to come within a predetermined distance from the structure 14. The first and second sets of electrodes 20 and 22 are positioned in the ground soil at a depth below the foundation of the structure 14 so as to prevent termites and other insects from crawling through the foundation of the structure 14 from therebelow. The electrical current flowing between the first and second sets of electrodes 20 and 22 is illustrated by the arrows labeled with the numeral 42.

Figure 3:
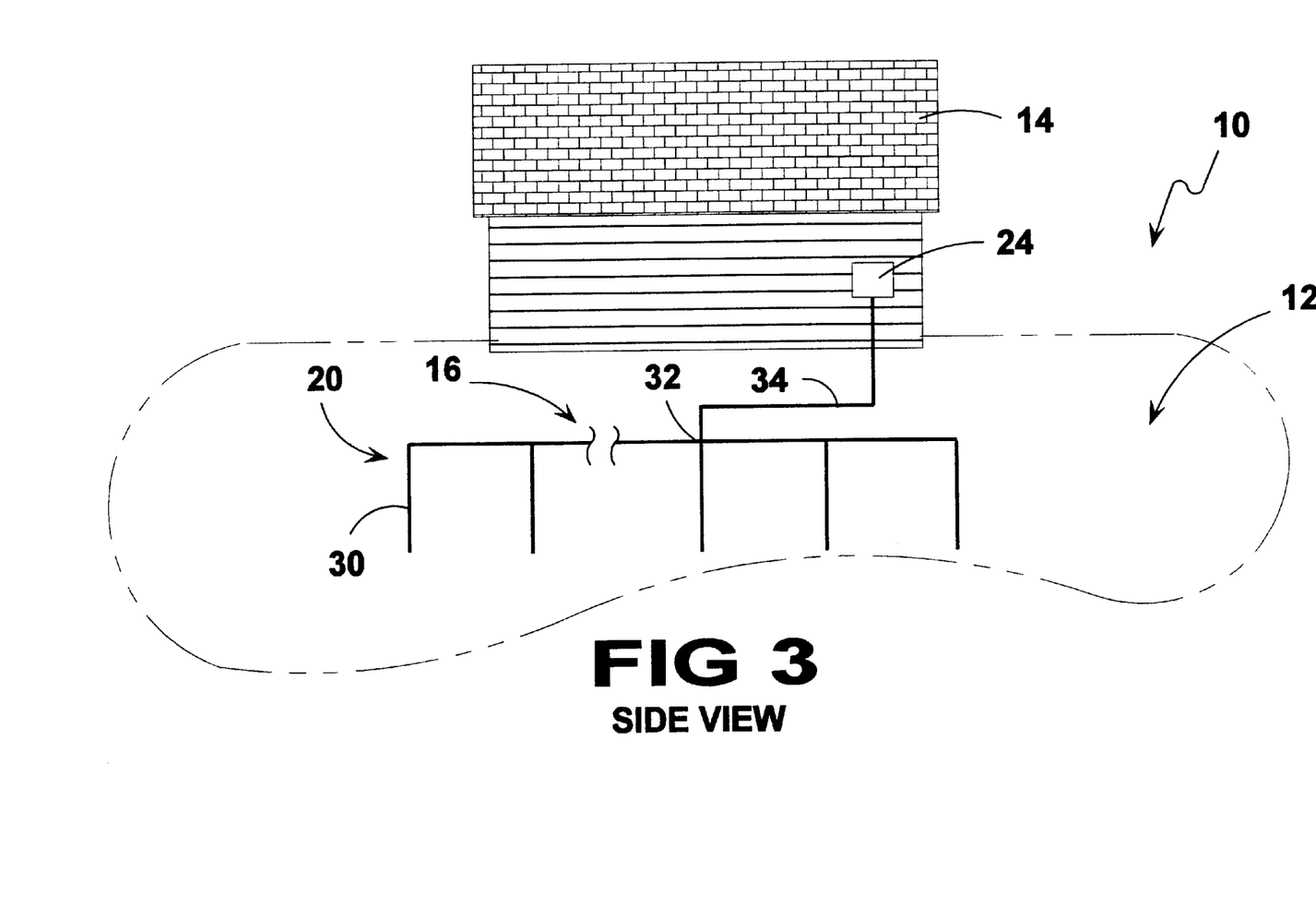
FIG. 3 is a side view of the apparatus for repelling ground termites of the present invention.

A side view of the apparatus for repelling ground termites 10 positioned below a structure 14 taken at a 90° rotation from FIG. 2 is illustrated in FIG. 3. As can be seen from this view the first and second sets of electrodes 20 and 22 cover a distance greater than the length of the structure 14 thereby creating a desired area 16 having dimensions greater than the area of the structure 14. The first and second set of electrodes 20 and 22 also contain at least four (4) electrodes 30 and 36, respectively. The electrodes 30 and 36, of each set are connected at a common point 32 and 38, respectively. The common points 32 and 38 are each connected to the power source 24 via a lead line 34 and 40, respectively.

Figure 4:
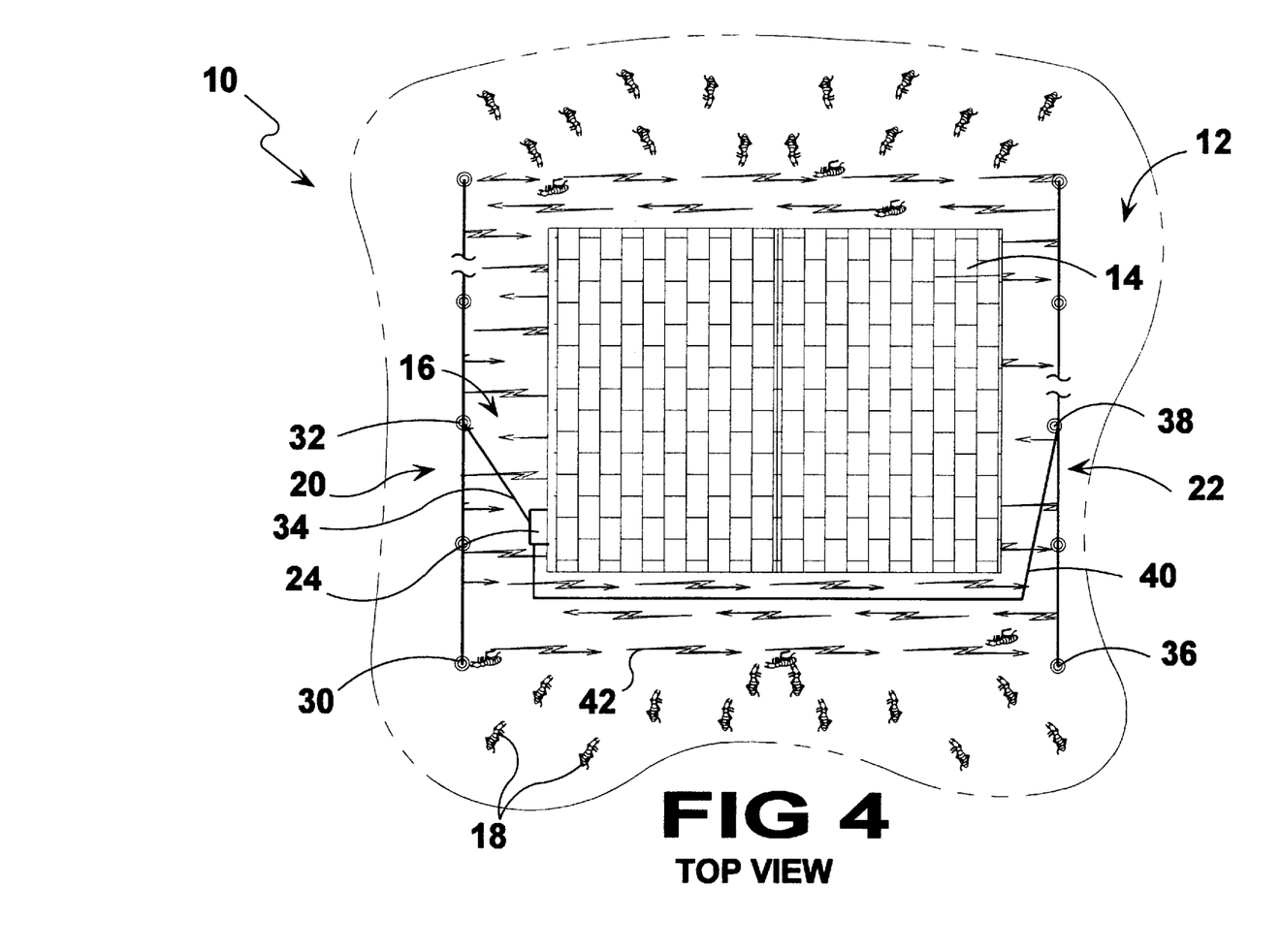
FIG. 4 is a top view of the apparatus for repelling ground termites of the present invention.

A top view of the apparatus for repelling ground termites 10 positioned below a structure 14 is illustrated in FIG. 4. This figure illustrates the dimensions of the desired area 16. The desired area 16 is filled with arrows 42 representing the electrical current flowing therein. The desired area 16 is defined on a first side by the distance that the first set of electrodes 20 extends. A second side, opposite the first side of the desired area, is defined by the distance that the second set of electrodes 22 extends. A third side extends between a first end of the first set of electrodes 20 and a first side of the second electrodes 22. A fourth side extends between a second end of the first set of electrodes 20 and a second side of the second electrodes 22. The structure 14 is completely contained within the boundaries defined by the desired area 16. Thus, the structure 16 is completely protected around its sides and underneath from invasion and damage caused by any termites 18 or other insects and pests which may crawl therein.

The operation of the apparatus for repelling ground termites 10 will now be described with reference to the figures. In operation, the first and second sets of electrodes 20 and 22 of the apparatus for repelling ground termites 10 are positioned within the ground soil on opposing sides of a structure 14 to be protected and spaced from their respective side of the structure 14. The first and second sets of electrodes 20 and 22 each extend for a length greater than the length of the side of the structure on which they are positioned and are placed at a depth below the foundation of the structure 14. After the first and second sets of electrodes 20 and 22 are positioned in the soil, the lead line 34 and 40 of each set is connected to the power source 24. Preferably, the power is provided by the power source 24 which supplies power to the structure 14. The apparatus for repelling ground termites is now ready for operation.

Upon turning on the power source, an electrical current is caused to flow through the lead lines and to the electrodes forming the first and second sets of electrodes 20 and 22. The electrical current flows through the electrodes and into the soil in which the first and second sets of electrodes 20 and 22 are positioned. The electrical current flows through the soil and between the first and second sets of electrodes 20 and 22 forming a barrier region surrounding the structure 14. Any termites, insects, pests, nematodes or arthropods which enter the barrier region are electrocuted by the current flowing between the first and second sets of electrodes 20 and 22. Thus, the structure is protected from damage which may be caused by such pests.

From the above description it can be seen that the apparatus for repelling ground termites of the present invention is able to overcome the shortcomings of prior art devices by providing a apparatus for repelling ground termites which is able to provide protection for a desired area from termites by treating the ground of the area with an electrical current. The apparatus for repelling ground termites is also able to provide protection for generally inaccessible areas such as beneath a wooden structure by supplying the electrical current using a plurality of electrodes extending into the ground which are in the form of metal stakes or flat metal plates of any desired shape or size which can be easily inserted into the ground. The apparatus for repelling ground termites includes two sets of electrodes positioned in the ground on opposing ends of the desired protection area whereby the electrical current flows through the soil and between the two sets of electrodes, each set of electrodes including at least four electrodes. Furthermore, the apparatus for repelling ground termites of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for repelling ground termites from a ground area surrounding a structure in combination with said structure, said apparatus being connected to a power source and comprising:

a) a first set of electrodes positioned in the ground area on a first side of the structure;

b) a second set of electrodes positioned in the ground area on a second side of the structure;

c) a horizontally extending first lead line below ground level connected between said first set of electrodes and the power source for supplying an electrical current to said first set of electrodes with a vertical extension of said first lead line to said power source; and d) a horizontally extending second lead line below ground level connected between said second set of electrodes and the power source for supplying an electrical current to said second set of electrodes with a vertical extension of said second lead line to said power source, wherein the electrical current supplied to said first and second sets of electrodes is delivered to the ground in which said first and second sets of electrodes are positioned and flows through the ground between said first and second sets of electrodes forming a barrier region within which any termites will be electrocuted;

e) said first set of electrodes includes a plurality of at least four individual electrodes, each individual electrode being directly connected to said first lead line, and said second set of electrodes includes a plurality of at least four individual electrodes each being directly connected to said second lead line;

f) said first and second sets of electrodes each extend for a distance longer than the side of the structure on which said sides are positioned, said first and second sets of electrodes are positioned at a distance from each other greater than the width of the structure, and said first and second sets of electrodes are each positioned at a distance spaced from their respective sides of said structure;

g) said first and second lead lines and said first and second sets of electrodes are each positioned at a depth in the ground below a foundation of the structure;

h) a distal end of each of said first and second lead lines making a right angle turn downwardly and terminating in a common connection point from which extends respective first and second electrode lead lines connected to top ends of said first and second sets of electrodes.

2. The apparatus for repelling ground termites from a ground area surrounding a structure in combination with said structure as recited in claim 1, wherein each of said plurality of electrodes in said first and second sets of electrodes is in the form of a spike.

3. The apparatus for repelling ground termites from a ground area surrounding a structure in combination with said structure as recited in claim 1, wherein each of said plurality of electrodes in said first and second sets of electrodes is in the form of a flat metal plate.

* * * * *